US008666420B2

United States Patent
Rangarajan et al.

(10) Patent No.: US 8,666,420 B2
(45) Date of Patent: Mar. 4, 2014

(54) BUILDING WIRELESS ROUTING STRUCTURES USING OUT OF BAND SIGNALING

(75) Inventors: Hari Narayanan Rangarajan, Milpitas, CA (US); Jyoti Raju, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1310 days.

(21) Appl. No.: 12/061,399

(22) Filed: Apr. 2, 2008

(65) Prior Publication Data

US 2009/0252127 A1    Oct. 8, 2009

(51) Int. Cl.
*H04W 36/00* (2009.01)

(52) U.S. Cl.
USPC ........... 455/442; 455/436; 455/450; 370/338; 370/343; 370/345; 340/554; 340/578

(58) Field of Classification Search
USPC .......... 455/442, 436, 450; 370/338, 343, 345; 340/554, 578
See application file for complete search history.

(56) References Cited

U.S. PATENT DOCUMENTS

| 7,486,676 | B1 * | 2/2009 | Dunn et al. | 370/392 |
| 7,724,708 | B2 * | 5/2010 | Shiue et al. | 370/332 |
| 2003/0087642 | A1 * | 5/2003 | Mazzara | 455/450 |
| 2004/0146022 | A1 * | 7/2004 | Lewis et al. | 370/331 |
| 2004/0151137 | A1 * | 8/2004 | McFarland et al. | 370/329 |
| 2005/0147071 | A1 * | 7/2005 | Karaoguz et al. | 370/338 |
| 2006/0056344 | A1 * | 3/2006 | Roy et al. | 370/329 |
| 2006/0072502 | A1 * | 4/2006 | Crandall et al. | 370/329 |
| 2006/0073827 | A1 * | 4/2006 | Vaisanen et al. | 455/436 |
| 2006/0082489 | A1 * | 4/2006 | Liu et al. | 342/52 |
| 2006/0214837 | A1 * | 9/2006 | Liu et al. | 342/52 |
| 2006/0280131 | A1 * | 12/2006 | Rahman et al. | 370/256 |
| 2009/0160696 | A1 * | 6/2009 | Pare et al. | 342/20 |
| 2009/0168647 | A1 | 7/2009 | Holness et al. | |

OTHER PUBLICATIONS

U.S. Appl. No. 12/061,384, filed Apr. 2, 2008, Rangarajan et al.

* cited by examiner

*Primary Examiner* — Nimesh Patel
(74) *Attorney, Agent, or Firm* — Tucker Ellis LLP

(57) ABSTRACT

In an example embodiment, an access point (AP) uses out-of-band signaling on a single non-DFS (Dynamic Frequency Selection) frequency band radio in an N-radio system to synchronize information with neighboring APs and to learn about their radio interfaces. This enables the AP to be able to acquire information about neighbor APs on different frequency bands and to build and maintain mesh routing structures while minimizing backhaul down-time.

17 Claims, 3 Drawing Sheets

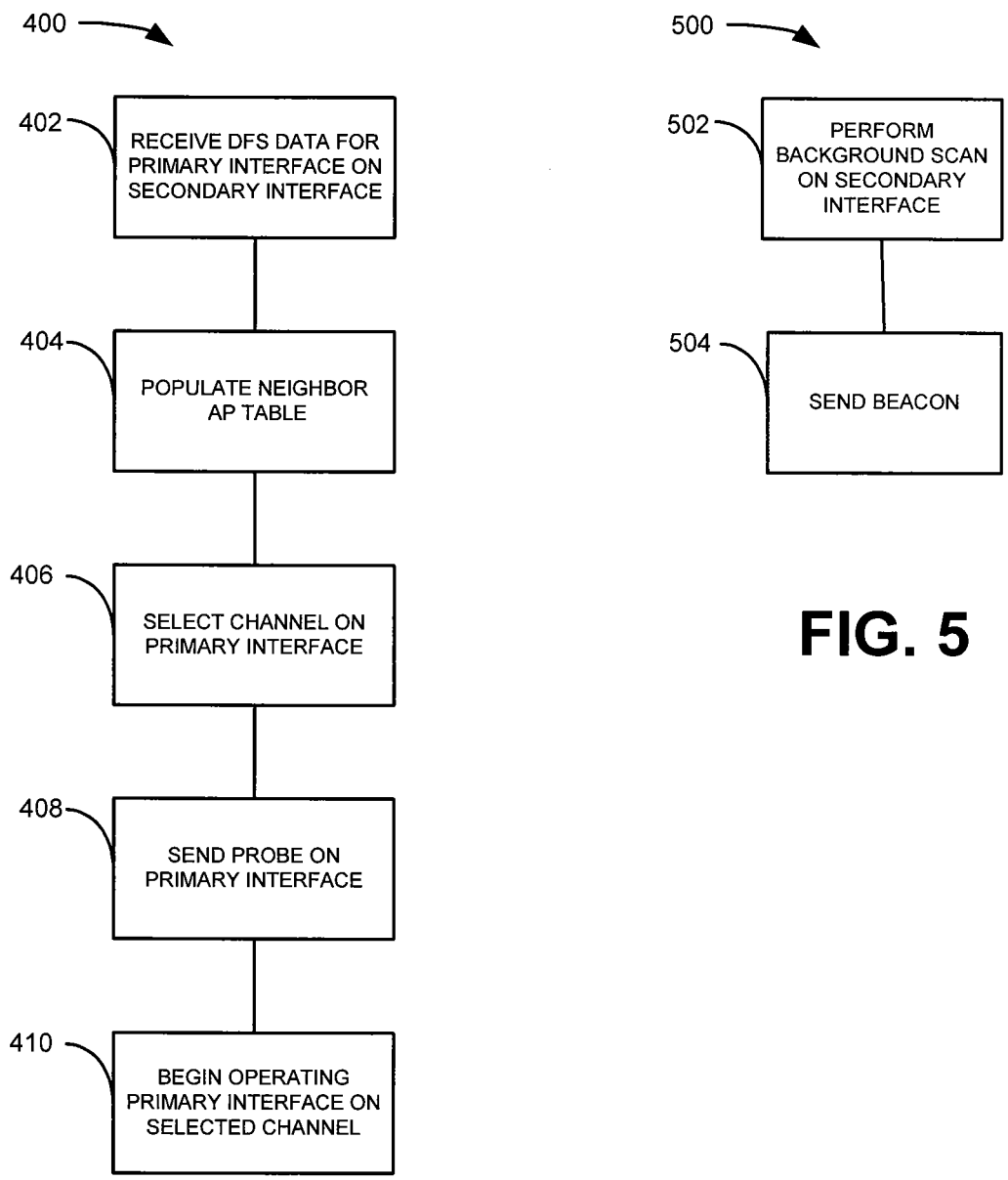

BUILDING WIRELESS ROUTING STRUCTURES USING OUT OF BAND SIGNALING

TECHNICAL FIELD

The present disclosure relates generally to wireless networks, such as mesh networks.

BACKGROUND

Wireless Access Points (APs) can consist of one or more radios that operate on different frequency bands. In some wireless networks, it is necessary for access points to communicate with neighboring APs that operate on different channels. A typical example of this mode of communication would be in wireless mesh networks that comprise mesh APs that communicate to a central switch (aka controller) via neighboring nodes through a multi-hop routing tree. For example, to establish the routing tree, mesh APs scan the different frequency channels looking for neighboring mesh APs which they can pick as a parent for the routing tree being built. The parent selection algorithm selects the best neighbor based on parameters such as distance to the controller, link SNR (Signal to Noise Ratio), etc. Once a parent is selected, the mesh AP operates only on this channel, which is referred to as the base operating channel. Any channel that is not the same as the base channel is an off-channel. Fixing the base operating channel restricts the ability of an AP to locate neighbors on off-channels because the AP can only assess neighbors on the same channel. During this time, it is possible that newer, better neighbors operating on the off-channels have commenced operation. To maintain optimal routing paths, it is desirable that these new neighbors on the other channels be detected. The mesh AP can scan in the background to detect new neighbors on off-channels. This technique is referred to as background scanning. With background scanning, mesh APs go off-channel for about 50 ms and look for neighbors on an off-channel by sending neighbor probe packets. Although, this feature helps solve the problem of finding neighbors on different channels, it introduces performance related issues: (a) the period of non-operation on the original channel can cause loss of packets that were transmitted to the AP, and also reduces the effective transmission bandwidth of the AP; and (b) on DFS (Dynamic Frequency Selection) channels, it is not possible to send out neighbor probe packets unless the channel has been determined to be "radar-safe". For example, due to regulatory requirements some channels (such as Institute of Electrical and Electronics Engineers "IEEE" 802.11a compatible DFS channels) are monitored for a predetermined time period before they can be used (for example at least 60 seconds for IEEE 802.11a channels). Because of the latter limitation, background scanning passively listens for neighbor updates that are sent pro-actively every half-a-second. For example, if background scanning parameters are set so that the radio goes off-channel every 5 secs for 50 ms, and pro-active updates are sent every 500 ms, simple calculations show that this would require 43 off-channel scans in order to receive an update within the 50 ms window with 99% probability, rendering the background scanning feature in DFS channels ineffective.

BRIEF DESCRIPTION OF THE DRAWINGS

The accompanying drawings incorporated herein and forming a part of the specification illustrate the examples embodiments.

FIG. 4 illustrates an example methodology for connecting to a mesh backhaul.

FIG. 5 illustrates an example methodology for using beacons on a secondary interface to build a mesh routing structure using out-of-band signaling.

OVERVIEW OF EXAMPLE EMBODIMENTS

Figure 1:
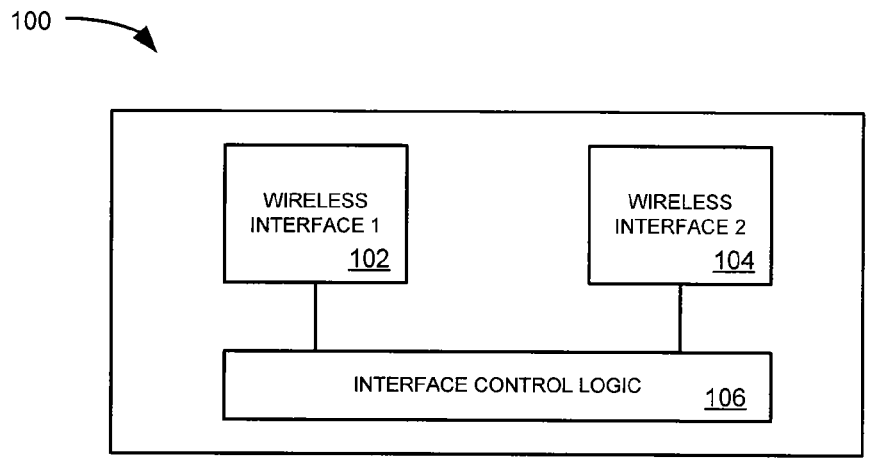
FIG. 1 illustrates an example of a wireless device configured in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising a first wireless interface, a second wireless interface, and control logic coupled to the first and second wireless interfaces. The control logic is configured to send data and receive data via the first and second wireless interfaces. The control logic is operable to receive data on the secondary interface, the data comprising data representative of a channel compatible with the first wireless interface being used by a neighboring wireless device. The control logic is responsive to receiving the data to configure the first interface to operate on the channel.

In accordance with an example embodiment, there is disclosed herein, a method comprising configuring a first wireless transceiver to operate on a first channel selected from a first plurality of channels and configuring a second wireless transceiver to operate on a second channel selected from a second plurality of channels. The second wireless transceiver cycles through each of the second plurality of channels to send a beacon on each of the second plurality of channels. The beacon comprises data representative of the first channel.

In accordance with an example embodiment, there is disclosed herein, an apparatus comprising means for configuring a first wireless transceiver to operate on a first channel selected from a first plurality of channels and means for configuring a second wireless transceiver to operate on a second channel selected from a second plurality of channels, and means for cycling the second wireless transceiver to send a beacon on each of the second plurality of channels. The beacon comprises data representative of the first channel.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements.

In an example embodiment, a wireless mesh access points uses an 802.11a radio for backhauling client traffic and control packets. A routing tree is built on the 802.11a interface by detecting neighbors and selecting one of them as parent. Assume an N-radio interface based AP with at least one interface that operates in a band that is not limited by DFS regulations. This interface goes off-channel on all frequencies available on this band and emits a beacon every 100 ms (similar to the beacons that are sent to advertise Wireless LAN availabilities). The beacons list all the available radio interfaces and the corresponding operating channels on the interfaces. Using this passive scheme, in finite time, all APs in the neighborhood can build a table consisting of its neighboring APs, their available radio interfaces and the channels they are operating on.

An aspect of an example embodiment provides a solution to two issues on DFS channels: 1) locating a parent AP on start (e.g. after a reboot or restart of radio interface); and 2) determining which DFS channels are radar free.

On startup, a mesh AP would ordinarily scan all available channels to look for neighbors that can be used as parents. On DFS channels the mesh AP cannot transmit probe requests on until listening passively for 60 seconds due to DFS regulatory constraints. The Out of Band (OOB) signaling mechanism described herein enables a secondary, non-DFS interface (for example, an 802.11b channel) to be used to obtain information to identify DFS channels that are radar-safe. Neighbor APs can be probed on these channels quickly without any wait time. This can reduce the AP neighbor scan time on all channels from N*60 seconds where N is the number of channels on the DFS band radio, to p*c*0.1 seconds, where c is the number of 802.11b channels and p the number of rounds required for all nodes to reliably converge on the table information.

The OOB background scanning feature can be used to populate a table comprising neighbor information data. Data obtained by OOB background scanning can determine which DFS channels are radar-safe and a probe request can actually be sent out on the "safe" channels to collect neighbor AP information. Without this, the AP can only passively listen on these channels and the probability of receiving a neighbor update is low.

An example embodiment described herein provides performance improvements by avoiding off-channel bandwidth loss using heuristics common to DFS and non-DFS channels. For example, rather than performing background scanning and have performance hits, an AP can run mini-scan routines to go off-channel and use the OOB information to evaluate potential parent APs. These runs can be scheduled at a much slower rate than background scanning depending on the mesh structure or if the error rate, SNR towards the current parent falls below a certain threshold. Using data collected during OOB scanning it is possible to look at collected information and select channels for neighbor probes. If no suitable neighbors are seen on these channels, then background scanning can be turned off to avoid performance hits. A routing protocol can use the concept of BGNs (bridge group names) to identify parent APs. This can enable an AP to limit background scanning to channels that have a potential parent AP with the same BGN. It is also possible to carry more information like load information, noise floor, on the channel and other metrics that can be used to potentially evaluate the suitability of a parent AP on that channel An aspect of an example embodiment is that by using non-DFS channels, performance hits on the backhaul incurred due to background scanning going off-channel very frequently can be avoided. Out-of-band signaling on secondary radio interfaces (e.g. an 802.11b interface) is employed to acquire up-to-date information about neighboring APs on other channels on the backhaul interfaces (there can be more than one), thus reducing the amount of time that an AP goes off-channel on the backhaul interfaces. In addition, using neighbor APs to obtain data about a channel this ameliorates waiting periods, such as the 60 second quiet period for 802.11a channels. Also, an example embodiment provides the ability to probe for neighbor APs on DFS channels rather than passively listening for neighbor updates. An aspect of an example embodiment is that it allows mesh routing structures to be maintained. For example, a table can be maintained and updated when new APs come on-line on different channels or if the current channel properties change.

Referring to FIG. 1, there is illustrated an example of an apparatus 100 configured in accordance with an example embodiment. Apparatus 100 comprises a first wireless interface 102 and a second wireless interface 104. Interface control logic 106 is operable to control the operation of first wireless interface 102 and second wireless interface 104. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Control logic may be implemented as part of a radio resource module (RRM) associated with apparatus 100. As illustrated, control logic 106 is located within apparatus 100; however, in an example embodiment such as an AP using LWAPP (Lightweight Access Point Protocol) control logic 106 may distributed or located external to apparatus 100. For example control logic 106 may be located at a switch or centralized wireless controller (not shown).

In addition, apparatus 100 may suitably comprise more than two wireless interfaces. Two wireless interfaces are used in this example to simplify the explanation of the example embodiment. Those skilled in the art should readily appreciate that apparatus 100 may suitably comprise any physically realizable number of wireless interfaces.

In an example embodiment, apparatus 100 is employed to implement a mesh Access Point (MAP). In this example, first wireless interface 102 is used to couple apparatus 100 to the mesh backhaul, while second wireless interface 104 is used to provide service to wireless clients or other wireless devices.

Control logic 106 is operable to receive data on secondary interface 104. The data is representative of a channel compatible with the first wireless interface being used by a neighboring wireless device such as a neighboring MAP. Control logic 106 may store the received data in a database/table. Control logic 106 can use the received data to configure first interface 102 to operate on the channel, enabling first interface 106 to establish communication with the neighboring wireless device.

In an example embodiment, first wireless interface 102 is configured to operate on a channel selected from a first plurality of channels that have dynamic frequency selection regulations. For example, the first plurality of channels can be 802.11a channels that have regulatory rules for radar avoidance. The radar avoidance rules may mandate that wireless interface 102 passively listen on a channel for a predetermined amount of time (e.g. 60 seconds) before using the channel. Second wireless interface 104 is configured to operate on a second is plurality of channels. The second plurality of channels, such as 802.11b compatible channels, may not have any regulatory requirements. The data received on second interface 104 may include data that indicates that the 802.11a channel for the neighboring wireless device is clear of radar signals, ameliorating the passive listening mandate, which can allow first transceiver 102 to immediately being operating on the 802.11a channel.

In an example embodiment, once control logic 106 has learned about 802.11a channels for neighboring wireless devices, control logic can send a probe frame to a selected neighboring wireless device on the channel via first interface 102. Control logic 106 can be configured to wait for a response to the probe frame to establish communication with the wireless device on the primary interface. The probe response may include data from the neighboring device, including but not limited to received signal strength indication (RSSI), signal to noise ratio (SNR), throughput, available bandwidth, capacity, and/or hop count.

In an example embodiment, control logic 106 periodically sends beacons on all of the channels available to interface 104 that contain data representative of the channel wireless interface 102 is operating on. For example, if wireless interface 104 is an 802.11b interface, control logic 106 will have beacons sent on every 802.11b channel. The beacons may be sent periodically, for example every 100 ms.

Figure 2:
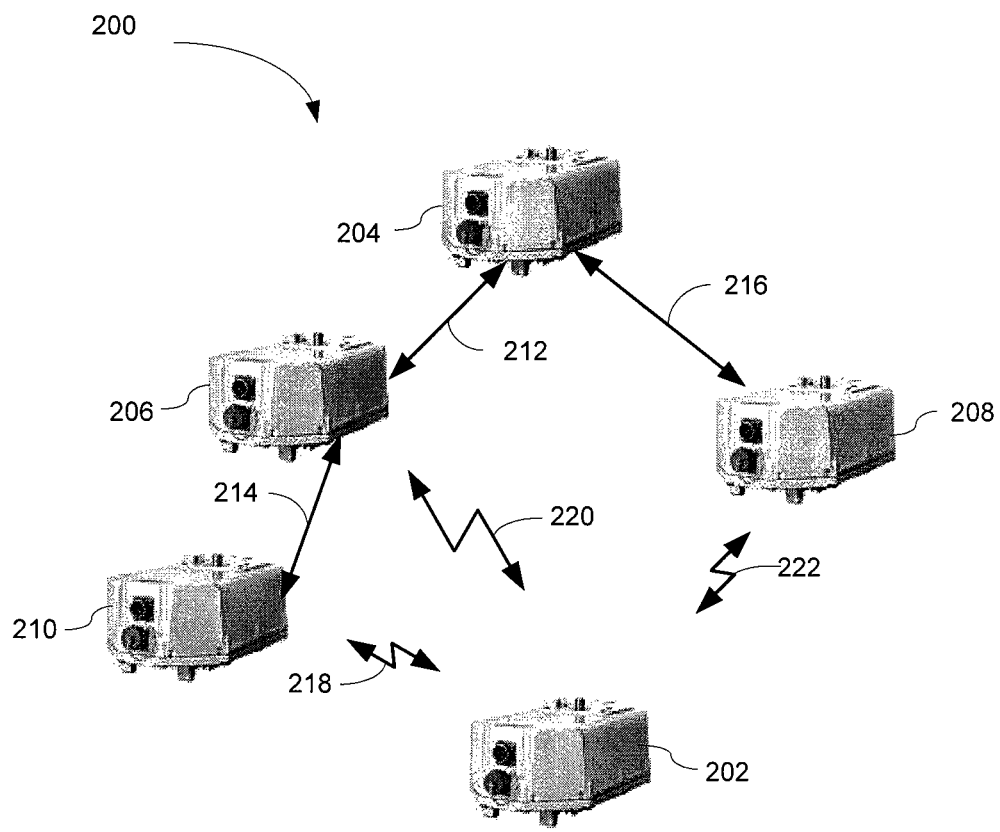
FIG. 2 illustrates an example of a wireless mesh network configured in accordance with an example embodiment.

FIG. 2 illustrates an example of a mesh network 200 configured in accordance with an example embodiment. The illustrated example comprises a Root Access Point (RAP) 204 coupled to mesh access points (MAPs) 206, 208 on wireless link 212, 216 respectively. In addition, MAP 206 is coupled to MAP 210 along wireless link 214.

MAP 202 can receive wireless signals 220, 222, 218 from MAPs 206, 208, 210 respectively. As described in the example embodiment in FIG. 1, MAP 202 has at least two wireless transceivers. In this example, the first wireless transceiver is configured to operate on the 802.11a (11a) compatible channels, for example operating using Orthogonal Frequency Division Multiplexing (OFDM) modulation in the 5 GHz band. The second wireless transceiver is an 802.11b/g compatible. In 802.11b (11b) operation, the second wireless transceiver can operate at the 2.4 GHz band using complementary code keying (CCK). In 802.11g operation (11g) the wireless transceiver is configured to operate on the 2.4 GHz band using OFDM modulation. In this example, the 802.11a channel is used for the mesh backhaul. As those skilled in the art can appreciate, 802.11a channels may be subject to DFS regulations, which mean that a device passively listens on the channel for 60 seconds to ensure it does not conflict with other wireless devices, such as radar.

In accordance with an example embodiment, MAP 202 acquires data about neighboring access points through signals such as beacons and/or other frames from the neighboring access points received on the 802.11b interface From these signals, MAP 202 determines the 802.11a channel for neighboring APs 206, 208, 210. MAP 202 then switches to the 802.11a channels of at least one of neighboring APs 206, 208, 210 (in a mesh network the backhaul for a branch of the mesh tree may use the same channel so it is possible that the 802.11a channel for wireless link 212 is the same as the 802.11a channel for wireless link 214) and sends a probe to at least one of them. The probes may be sent in any order.

MAP 202 can execute an algorithm for deciding which of MAPs 206, 208, 210 to select as a parent. For example, MAP 202 may send probe frames to each of MAPs 206, 208, 210 on their 802.11a channel (which was learned from the scan of the 802.11b channels) and wait for responses. MAP 202 can select a parent based on any criteria including but not limited to signal quality, received signal strength indication (RSSI), signal to noise ratio (SNR), throughput, hop count, capacity or any combination of criteria. For example, although MAPs 206, 208 have a lower hop count than MAP 210 (and MAP 208 has no child MAPs) MAP 202 may select MAP 210 for a parent MAP because MAP 210 is closer to MAP 202 which may result in better signal quality, higher capacity and higher throughput than available from MAPs 206, 208. In an example embodiment, MAP 202 determines from parameters such as the load on the interface, and If acceptable, 802.11a communication can be established, the MAP 202 can skip probing MAPs 206, 208.

After MAP 202 begins operating on a base channel (for example the primary interface's 11a channel). MAP 202 can also be configured to periodically send beacons on all available 802.11b channels containing data representative of its primary (11a) configuration (for example the current channel the 802.11a interface is using, or in the case of multiple 802.11a interfaces the channel of the 802.11a interface coupled to the backhaul). For example, MAP 202 may cycle through each 802.11b channel at predetermined intervals, such as 100 ms (milliseconds) to send the beacons. The beacon may also suitably comprise data about the channel, such as no external signals (e.g. radar) have been detected (or none since a specified time), signal quality, etc. This would allow APs 206, 208, 210 to learn the operating channel and/or other data (such as channels and the last time when radar was detected on an 802.11a channel) for AP 202.

Figure 3:
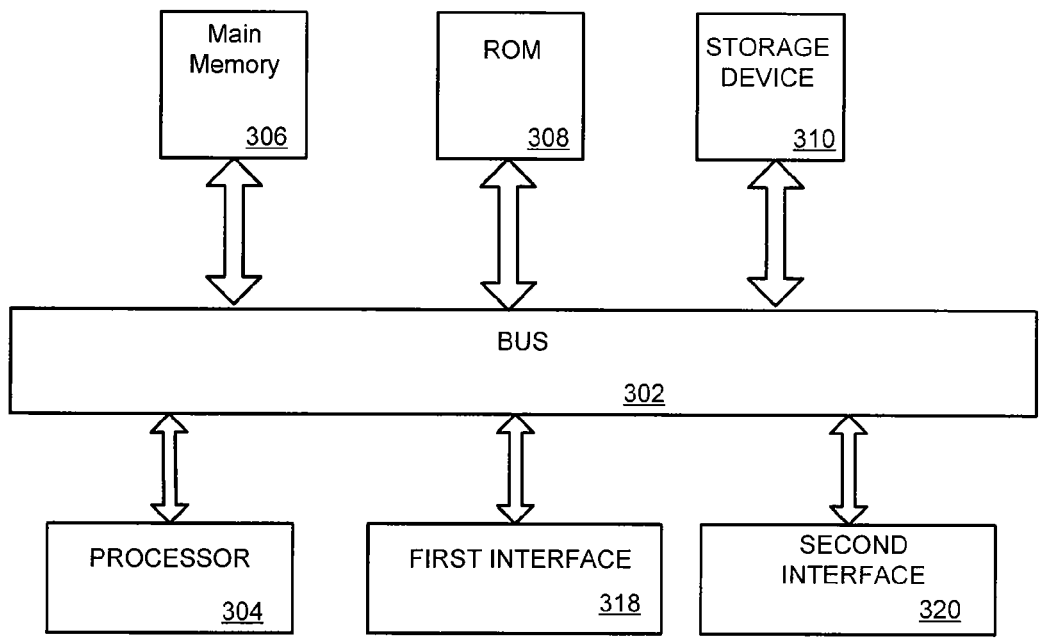
FIG. 3 illustrates an example of a computer system upon which an example embodiment may be implemented.

FIG. 3 is a block diagram that illustrates a computer system 300 upon which an example embodiment may be implemented. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for building a mesh routing structure using out-of band-signaling. According to an example embodiment, building a mesh routing structure using out-of band-signaling is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

In an example embodiment, computer system 300 also includes a first wireless communication interface 318 and a second wireless communication interface 320 coupled to bus 302. Communication interfaces 318, 320 provide a two-way wireless communication coupling computer system 300 to a network.

In an example embodiment, processor 304 provides instructions for configuring first communication interface 318 and second communication interface 320. For example, first wireless communication interface 318 can be configured to operate using a first protocol, e.g. the 802.11a protocol, on a selected channel (e.g. channel 161) and may be designated the communication interface for a spanning tree. Second wireless communication interface 320 can be configured to operate using a second wireless protocol, e.g. the 802.11b protocol, on a selected channel (e.g. channel 5) with no spanning tree links. As described herein processor 304 can send beacons comprising configuration data for the first and second interfaces 318, 320 on both interfaces 318, 320 and/or send probe responses requesting data from neighboring devices. Similarly, processor 304 can receive beacons and/or probe responses from other devices via the first wireless communication interface 318 and the second communication interface 320. As described herein, processor 304 can change the configuration of first communication interface 318 and/or second communication interface 320 in response to detected events, such as radar detection or determining a channel is too noisy, and/or loss of a signal from another device. Processor 304 can also change the configuration of first communication interface 318 and/or second communication interface 320 in response to beacons received from another device, e.g. from a parent mesh AP, indicating the other device is changing to a different channel. For example, processor 304 can change the channel on first wireless communication interface 318 from channel 161 to channel 148 in response to a beacon received on second communication interface 320.

In an example embodiment, processor 304 acquires data about neighboring APs, such as operating channel, load, RSSI, throughput, SNR, etc. via second communication interface 320. This can enable processor 304 to select a backhaul channel and parent AP. Processor 304 can then configure first communication interface 318 accordingly. In particular embodiments, processor 304 may also send beacons on secondary interface 320 comprising data representative of the configuration of first interface 318.

In view of the foregoing structural and functional features described above, methodologies in accordance with example embodiments will be better appreciated with reference to FIGS. 4 and 5. While, for purposes of simplicity of explanation, the methodologies of FIGS. 4 and 5. are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement the methodologies. The methodologies described herein are suitably adapted to be implemented in hardware, software, or a combination thereof.

FIG. 4 illustrates an example methodology 400 for connecting to a backhaul channel such as a wireless mesh backhaul channel. Method 400 may be implemented by a wireless device, such as a MAP, during startup (e.g. part of the boot process) or can be executed periodically.

At 402, the wireless device receives data on the secondary channel about neighboring devices, such as MAPs that are operating on channels compatible with the wireless device's primary interface. The wireless device may passively scan the secondary channels and/or sending a probe request on the secondary channels. The data may also include DFS data, such as whether the channel is radar free or for how long a channel has been radar free. In an example embodiment, the wireless device is an 802.11 compatible MAP, the primary interface can be an 802.11a compatible interface while the secondary interface can be an 802.11b, 802.11g or 802.11b/g compatible interface. As illustrated at 404, the data may be stored in a table. For example the wireless device may maintain a table of neighboring MAPs.

In an example embodiment, the first wireless interface operates on a channel selected from a first plurality of channels that have dynamic frequency selection regulations. For example, the first plurality of channels can be 802.11a channels that have regulatory rules for radar avoidance. The radar avoidance may mandate that first wireless interface passively listen on a channel for a predetermined amount of time (e.g. 60 seconds) before using the channel. The secondary wireless interface is configured to operate on a second plurality of channels. The second plurality of channels, such as 802.11b compatible channels, may not have any regulatory requirements. The data received on second interface, at 402, may include data that indicates that the channel 802.11a channel for the neighboring wireless device is clear of radar signals, ameliorating the passive listening mandate, which can allow first interface to immediately being operating on the 802.11a channel.

At 406, the wireless device selects a channel on its primary interface. The channel for the primary interface is based on the neighboring wireless device data received at 402. The wireless device can use the received data to configure the first interface to operate on a channel that enables communication with the neighboring wireless device to be established via the first interface.

At 408, the wireless device sends a probe frame on the selected channel of the primary interface. The probe frame can be directed to a selected neighboring wireless device. In an example embodiment, the wireless device waits for a response to the probe frame to establish communication with the wireless device on the primary interface. The probe response may include data from the neighboring device, including but not limited to received signal strength indication (RSSI), signal to noise ratio (SNR), throughput, available bandwidth, capacity, and/or hop count.

At 410, the wireless device begins operating the primary interface on the selected channel. In an example embodiment, the secondary interface periodically scans channels, enabling the wireless device to detect new (and potentially) better wireless devices to establish communication with on its primary interface and/or to detect changes in network configuration, while not interrupting communication on the primary interface.

FIG. 5 illustrates an example methodology 500 that sends beacons on a secondary interface to facilitate building a mesh routing structure on a primary interface using out-of-band signaling. In an example embodiment, a first (primary) interface is configured to operate on a first channel selected from a first plurality of channels. A second (secondary) interface is configured to operate on a second channel selected from a second plurality of channels.

At 502, the secondary interface wireless device periodically scans each channel of the second plurality of channels. The secondary interface may scan for beacons or passively listen on each of the second plurality of channels to learn about neighboring wireless devices, such as neighboring MAPs. For example, a MAP may use a feature such as Radio Resource Management (RRM) on the secondary interface to cycle through different channels by gong off-channel and performing channels tests.

While on each channel, as illustrated at 504, a beacon is sent on the secondary interface. The beacon suitably comprises data representative of the wireless channel that the first interface is operating on. In a mesh architecture, this would enable a MAP receiving the beacon to quickly establish communication with the wireless device on the primary interface. The beacon may also comprise data about events such as radar detected on the frequency, or whether the channel is clear. For example, the beacon may contain data that no radar events have been detected or no radar events have been detected since a certain time.

Methodology 500 may be repeated at predetermined intervals. For example, methodology 500 can be repeated every 100 ms. This can enable neighboring devices to acquire knowledge about the primary interface on their secondary channels. In addition, this can allow neighboring devices to build neighbor tables and allow the neighboring device to determine whether it should change its primary interface, for example whether a MAP should select a new parent MAP.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a first wireless interface configured to operate on a first plurality of channels that have dynamic frequency selection regulations;
a second wireless interface configured to operate on a second plurality of channels that do not have the dynamic frequency selection regulations;
control logic coupled with the first and second wireless interfaces, the control logic being configured to send data and receive data via the first and second wireless interfaces;
wherein the control logic is operable to receive data on the second wireless interface, the data comprising data representative of a set of channels compatible with the first wireless interface being used by associated neighboring wireless devices, wherein the data representative of the set of channels compatible with the first wireless interface comprises data indicating radar safe channels of the set of channels compatible with the first wireless interface that are clear of radar signals;
wherein the control logic is configured to selectively send a probe request via the second wireless interface for requesting the data from the associated neighboring wireless devices;
wherein the control logic is responsive to receiving the data indicating a the radar safe channels of the set of channels compatible with the first wireless interface that are clear of radar signals to select a first radar safe channel from the radar safe channels of the channels compatible with the first interface that are clear of radar signals, and configure the first interface to operate on the selected first radar safe channel;
wherein the control logic configures the first interface to operate on the selected first radar safe channel without waiting to detect radar signals after selecting the selected first radar safe channel;
wherein the apparatus is a mesh access point;
wherein a mesh backhaul is established on the selected first channel.

2. The apparatus of claim 1, wherein the first plurality of channels are 802.11a compatible channels.

3. The apparatus of claim 2, wherein the second plurality of channels are 802.11b compatible channels.

4. The apparatus of claim 1, wherein the control logic maintains a table comprising data representative of operating frequencies of neighboring wireless devices operating on channels compatible with the first wireless interface.

5. The apparatus of claim 1, wherein the control logic sends a probe frame via the first wireless interface to collect neighbor information on channels that the data indicating a plurality of channels compatible with the first wireless interface that are radar safe indicates are radar.

6. The apparatus of claim 5, wherein the control logic is configured to wait for a response to the probe frame to establish communication with a wireless device on a primary interface.

7. The apparatus of claim 1, wherein the second wireless interface is configured to operate on a channel selected from a second plurality of channels;
wherein the control logic is configured to switch a secondary interface to another of the second plurality of channels;
wherein the control logic is configured to send a beacon via the second wireless interface, the beacon comprising data representative of the channel for the first wireless interface.

8. The apparatus of claim 7, wherein the control logic is configured to cycle through each of the second plurality of channels; and
wherein the control logic is configured to send a beacon via the second wireless interface, the beacon comprising data representative of the channel for the first interface on each of the second plurality of channels.

9. The apparatus of claim 8, wherein the control logic is configured to send the beacon on each of the second plurality of channels at a predetermined interval.

10. The apparatus of claim 9, wherein the predetermined interval is one-hundred milliseconds.

11. A method, comprising:
selectively operating a first wireless interface of an associated apparatus on a first plurality of channels that have dynamic frequency selection regulations;
selectively operating a second wireless interface of the associated apparatus on a second plurality of channels that do not have the dynamic frequency selection regulations;
receiving via the second wireless interface data representative of a set of channels compatible with the first wireless interface, wherein the data representative of the set of channels compatible with the first wireless interface comprises data indicating one or more radar safe channels of the set of channels compatible with the first wireless interface that are clear of radar signals, wherein the receiving comprises selectively sending a probe request by the second wireless interface and receiving the data in a probe response based on the probe request;
selecting a first radar safe channel from the one or more radar safe channels of the channels compatible with the first wireless interface that are clear of radar signals;
configuring the first wireless interface to operate on the selected first radar safe channel without waiting to detect radar signals after selecting the first radar safe channel;
configuring the second wireless transceiver to operate on a second channel selected from the second plurality of channels that do not have the dynamic frequency selection regulations;
selectively cycling the second wireless transceiver to send a beacon on each of the second plurality of channels; and
establishing a mesh backhaul on the selected first radar safe channel;
wherein the beacon comprises data representative of the first plurality of channels.

12. The method of claim 11, wherein the cycling the second wireless transceiver occurs periodically at predetermined intervals.

13. The method of claim 11, wherein the selected channel is subject to a passive waiting period for ensuring the first channel is clear for a predetermined amount of time before using the channel; and
wherein the beacon further comprises data indicating the selected channel has been clear the predetermined amount of time.

14. The method of claim 11, further comprising:
receiving data on the second wireless interface indicating a channel that a neighboring wireless device is operating on;
storing the received data; and
configuring the first wireless transceiver to operate on the channel the neighboring wireless device is operating on.

15. An apparatus, comprising:
means for selectively operating a first wireless interface of an associated apparatus on a first plurality of channels that have dynamic frequency selection regulations;
means for selectively operating a second wireless interface of the associated apparatus on a second plurality of channels that do not have the dynamic frequency selection regulations;
means for receiving via the second wireless interface data representative of a set of channels compatible with the first wireless interface, wherein the data representative of the set of channels compatible with the first wireless interface comprises data indicating one or more radar safe channels of the set of channels compatible with the first wireless interface that are clear of radar signals, wherein the means for receiving comprises means for selectively sending a probe request by the second wireless interface and means for receiving the data in a probe response based on the probe request;
means for selecting a first radar safe channel from the one or more radar safe channels of the channels compatible with the first wireless interface that are clear of radar signals;
means for configuring the first wireless interface to operate on the selected first radar safe channel selected from the channels compatible with the first wireless interface that are clear of radar signals;
means for configuring the second wireless interface to operate on a second channel selected from the second plurality of channels that do not have the dynamic frequency selection regulations; and
means for selectively cycling the second wireless interface to send a beacon on each of the second plurality of channels;
wherein the beacon comprises data representative of the first radar safe channel;
wherein a mesh backhaul is established on the first radar safe channel selected from the one or more radar safe channels compatible with the first wireless interface that are radar safe.

16. The apparatus according to claim 15, further comprising:
means for receiving data on the second wireless interface indicating a channel that a neighboring wireless device is operating on that is compatible with the first interface and is radar safe;
means for storing the received data; and
means for configuring the first wireless interface to operate on the channel the neighboring wireless device is operating on without waiting to detect radar signals after selecting the channel the neighboring wireless device is operating on.

17. The apparatus according to claim 1, wherein the data representative of channels compatible with the first wireless interface comprises data indicating how long a channel has been radar free.

* * * * *